United States Patent
Chung (10) Patent No.: US 8,138,688 B2
(45) Date of Patent: Mar. 20, 2012

(54) HALF-BRIDGE POWER CONVERTER FOR DRIVING LED BY SERIES-RESONANT CONNECTION OF INDUCTOR, INDUCTOR AND CAPACITOR

(75) Inventor: Il Hwi Chung, Seoul (KR)

(73) Assignee: AVERD Labs Co., Ltd., Goyang-si, Gyeonggi-do (KR)

( * ) Notice: Subject to any disclaimer, the term of this patent is extended or adjusted under 35 U.S.C. 154(b) by 250 days.

(21) Appl. No.: 12/692,427

(22) Filed: Jan. 22, 2010

(65) Prior Publication Data

US 2011/0181205 A1    Jul. 28, 2011

(51) Int. Cl.
G05F 1/00 (2006.01)
H05B 37/00 (2006.01)

(52) U.S. Cl. ........................................ 315/307; 315/291

(58) Field of Classification Search .................. 315/219, 315/200 R, 209 R, 185 R, 227 R, 291, 307
See application file for complete search history.

(56) References Cited

U.S. PATENT DOCUMENTS

| | | | |
|---|---|---|---|
| 6,911,848 B2 * | 6/2005 | Vinciarelli | 327/108 |
| 7,262,582 B2 * | 8/2007 | Warita et al. | 323/222 |
| 7,307,462 B2 * | 12/2007 | Cheng et al. | 327/175 |
| 7,586,298 B2 * | 9/2009 | Tabaian et al. | 323/288 |

* cited by examiner

Primary Examiner — Douglas W Owens
Assistant Examiner — Minh D A
(74) Attorney, Agent, or Firm — Lowe Hauptman Ham & Berner, LLP (57) ABSTRACT

Disclosed herein is an LLC half-bridge power converter for driving an LED, which uses a CMOS timer IC having 50% duty cycle and a usable frequency range of 50 KHz through 1 MHz as a controller. In the LLC half-bridge power converter for driving an LED, the output of a rectifier is detected to operate an opto-coupler according to a soft-start set value and the opto-coupler is controlled to be turned off when the output of the rectifier exceeds a set rated voltage. The capacitance of a frequency varying condenser of the controller is varied by the opto-coupler to change the frequency of the controller so as to rapidly stabilize the output level and maintain a desired output level.

3 Claims, 6 Drawing Sheets

50% DUTY CYCLE OSCILLATOR
The frequency of oscillation is
$$f = 1/(1.4\, R_C C)$$

HALF-BRIDGE POWER CONVERTER FOR DRIVING LED BY SERIES-RESONANT CONNECTION OF INDUCTOR, INDUCTOR AND CAPACITOR

BACKGROUND OF THE INVENTION

1. Field of the Invention

The present invention relates to a power converter (SMPS) that provides DC power required to operate general electronic devices such as computers, TVs and LED lamps, and more particularly, to a half-bridge power converter for driving an LED by series-resonant connection of an inductor, an inductor and a capacitor (referred to as LLC half-bridge power converter for driving an LED) that uses a CMOS timer IC having 50% duty cycle and a usable frequency range of 50 KHz through 1 MHz as a controller and varies the capacitance of a frequency variable condenser of the CMOS timer IC based on an output level to maintain a rated output.

2. Background of the Related Art

Current power converters for driving LED lamps do not meet high efficiency and low energy consumption because specifications of LEDs are unsettled and the power converters do not satisfy required conditions. This is caused by problems of LEDs and, particularly, short lifetime and high error rate of the power converters. Considering this circumstance, a problem calling for immediate solution is to secure high efficiency and high stability of power converters.

Flyback, forward and half-bridge power converters are typical PWM power converters currently most widely used. These power converters are easily designed when a frequency of lower than 100 KHz is applied thereto. In this case, however, efficiency of higher than 80% is difficult to achieve and the volume and manufacturing cost of the power converters increase.

An LLC (Inductor, Inductor and Capacitor) half-bridge power converter, which has been recently commercially used, is known as a power converter for driving LED lamps.

Figure 1:
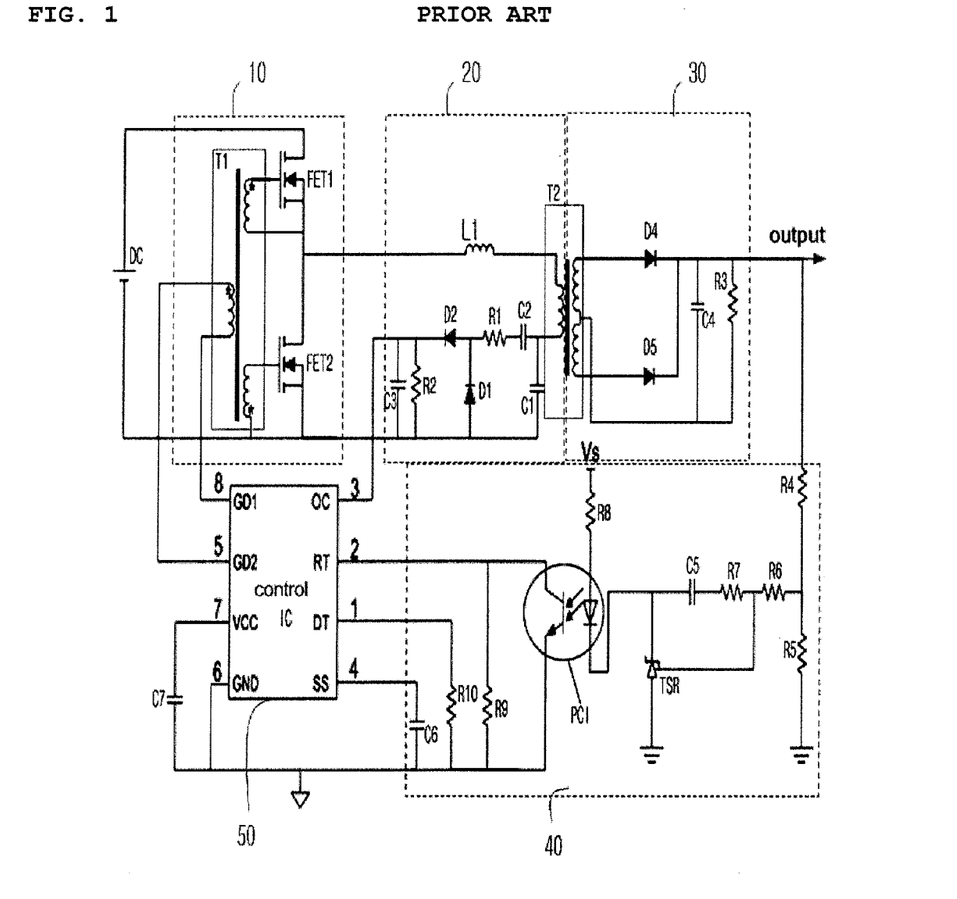
FIG. 1 is a circuit diagram of a conventional LLC half-bridge power converter.

FIG. 1 is a circuit diagram of a conventional LLC half-bridge power converter for driving an LED.

Referring to FIG. 1, the conventional LLC half-bridge power converter includes a controller 50 that generates a predetermined frequency signal to control output of DC power, a power output unit 10 that receives the frequency signal of the controller 50 through a primary coil of a first transformer T1 and switches a DC voltage through two switching transistors FET1 and FET2 controlled by outputs of two secondary coils of the first transformer T1 to generate AC pulse signals, an LLC resonator 20 that resonates the AC pulse signals of the power output unit 10 through an inductor L1, a primary coil of a second transformer T2 and a resonant condenser C1, a rectifier 30 that rectifies the voltage across both terminal of a secondary coil of the second transformer T2 according to diodes D4 and D5 and smoothens the rectified voltage through a smoothing condenser C4 to output a DC voltage (+12V) for driving a load, and an output level feedback unit 40 that divides the output of the rectifier through voltage-dividing resistors R4 and R5, detects the output level of the rectifier 30 according to a level detecting element TL431 and feeds back the output of the level detecting element TL431 to the controller 50 through an opto-coupler PC1.

In the conventional LLC half-bridge power converter constructed as above, when the primary coil of the first transformer T1 is controlled according to frequency control of the controller 50, voltages are respectively induced to the two secondary coils of the first transformer T1 according to a DC voltage applied to the power converter and the two switching transistors FET1 and FET2 respectively generate pulse signals. Then, the LLC resonator 20 resonates the pulse signals and the rectifier 30 rectifies the resonated signal to output a DC voltage for driving a load. The operation of the LLC half-bridge power converter is well-known in the art so that detailed explanation thereof is omitted.

In the above-described conventional LLC half-bridge power converter, when the output level is detected by the voltage-dividing resistors R4 and R5 of the feedback unit 40 and the divided voltages exceed a set voltage of the level detecting element TL431, the level detecting element TL431 is turned on to operate the opto-coupler PC1. Upon the operation of the opto-coupler PC1, the controller 50 fixes a resonant frequency to fix the output level.

However, if the feedback unit 40 does not apply a feedback signal to the controller 50 due to circuit failure even though the output level exceeds the set output level DC +12V, the controller 50 cannot control the output level to be increased to result in generation of a secondary trouble.

The control method used in the aforementioned conventional LLC half-bridge power converter converts the power state of the power converter into a maximum power state at a time set by a soft-start function of the controller 50. Here, the output of the rectifier 30 is monitored by the feedback unit 40 and fed back to the controller 50 according to voltage and current set values and the controller 50 controls a set voltage output to be maintained. This control method causes a problem that the output voltage exceeds a set level if the feedback unit 40 does not operate because the output voltage detecting function is impaired or other problems are generated. This may damage a device using the power converter.

Furthermore, the controller that determines the performance of the DC power converter according to a method improved more than conventional flyback, forward and half-bridge methods has a low frequency in the range of 50 KHz to 350 KHz and is expensive. Accordingly, a small-volume power converter is difficult to obtain at low cost.

SUMMARY OF THE INVENTION

Accordingly, the present invention has been made in view of the above-mentioned problems occurring in the prior art, and it is a primary object of the present invention to provide a power converter providing DC power required to operate general electronic devices such as computers, TVs and LED lamps, which is configured to achieve small power loss, high efficiency, low cost and minimum volume.

It is another object of the present invention to provide a power converter that employs a CMOS timer IC to use a frequency band in the range of 50 KHz to 1 MHz so as to achieve high efficiency of higher than 90%, high stability and minimum volume.

It is still another object of the present invention to provide a power converter that has a feedback circuit configured in the form of an active circuit to apply a feedback signal to a controller as an ON signal until the output reaches a maximum level and apply the feedback signal to the controller as an OFF signal when the output corresponds to the maximum level to prevent generation of over-voltage when a secondary side has a trouble.

According to an aspect of the present invention, there is provided an LLC half-bridge power converter for driving an LED, which is configured to generate an output pulse signal through an output unit according to frequency control of a controller, resonate the output pulse signal of the output unit through an LLC resonator, rectify the output pulse signal through a rectifier at the secondary side of the LLC resonator to output a DC voltage to a load, and feed back the output of the rectifier to the controller through a feedback unit, wherein the controller is a CMOS timer IC that has a usable frequency range of 50 KHz through 1 MHz and decreases the frequency of the output unit to increase the output until the output of the rectifier reaches a set value, and the feedback unit is configured to detect the output of the rectifier, generates an ON signal until the output of the rectifier reaches the set value to decrease the frequency output from the controller to the output unit, and generates an OFF signal when the output of the rectifier reaches the set value to maintain the frequency output from the controller to the output unit so as to maintain the output of the rectifier as a set level.

The feedback unit includes a soft-start setting unit integrating the output of the rectifier, a level detector dividing the output of the rectifier through voltage-dividing resistors, detecting whether the divided voltages exceed a set level through a level detecting element and bypassing the output of the soft-start setting unit when the divided voltages exceed the set level through a transistor, an opto-coupler for a feedback signal, which has a light-emitting device controlled by the output of the soft-start setting unit controlled by the level detector and a light-receiving element generating a feedback signal, a controller frequency varying unit dividing an external DC power through voltage-dividing resistors, applying a bias voltage to a second terminal of a frequency varying condenser of the controller and controlling the bias of the second terminal of the frequency varying condenser according to the light-receiving element of the opto-coupler, and a protecting circuit receiving the output pulse signal of the output unit through reverse diodes and turning off the light-receiving element of the opto-coupler to protect the light-receiving element when the output pulse signal of the output unit exceeds the set value.

The LLC half bridge power converter according to the present invention does not use a dedicated control IC and employs a conventional CMOS timer IC to extend a usable frequency band to a range of 50 KHz to 1 MH to achieve high efficiency of higher than 90%, high stability and minimum volume and decrease the manufacturing cost. Furthermore, the LLC half bridge power converter according to the present invention has a feedback circuit configured in the form of an active circuit to decrease the frequency of the controller according to an ON signal in the initial stage so as to increase the output and maintain the frequency by turning off the feedback circuit when the output reaches a rated voltage. Accordingly, the output is prevented from exceeding the rated voltage even if the feedback circuit has a trouble due to failure at the secondary side, and thus stability is secured.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention will now be described more fully with reference to the accompanying drawings, in which exemplary embodiments of the invention are shown.

An AC/DC or DC/DC power converter is confronted with user's demands for low manufacturing cost, high efficiency and small volume. The most suitable solution for this problem is an LLC half-bridge power converter.

However, LLC half-bridge ICs generally provided by IC makers are dedicated ICs that are expensive and have narrow frequency bands in the range of 50 KH to 350 KH. These ICs cannot satisfy various demands of users.

To meet the various demands of users, a low-cost, high-efficiency and small-volume circuit that satisfies a frequency band in the range of 50 KHz to 1 MHz which is the most important requirement for the LLC half-bridge power converter, is needed.

Accordingly, the present invention provides a DC power converter circuit using a CMOS timer IC with verified stability among ICs produced for the past twenty years.

Figure 2:
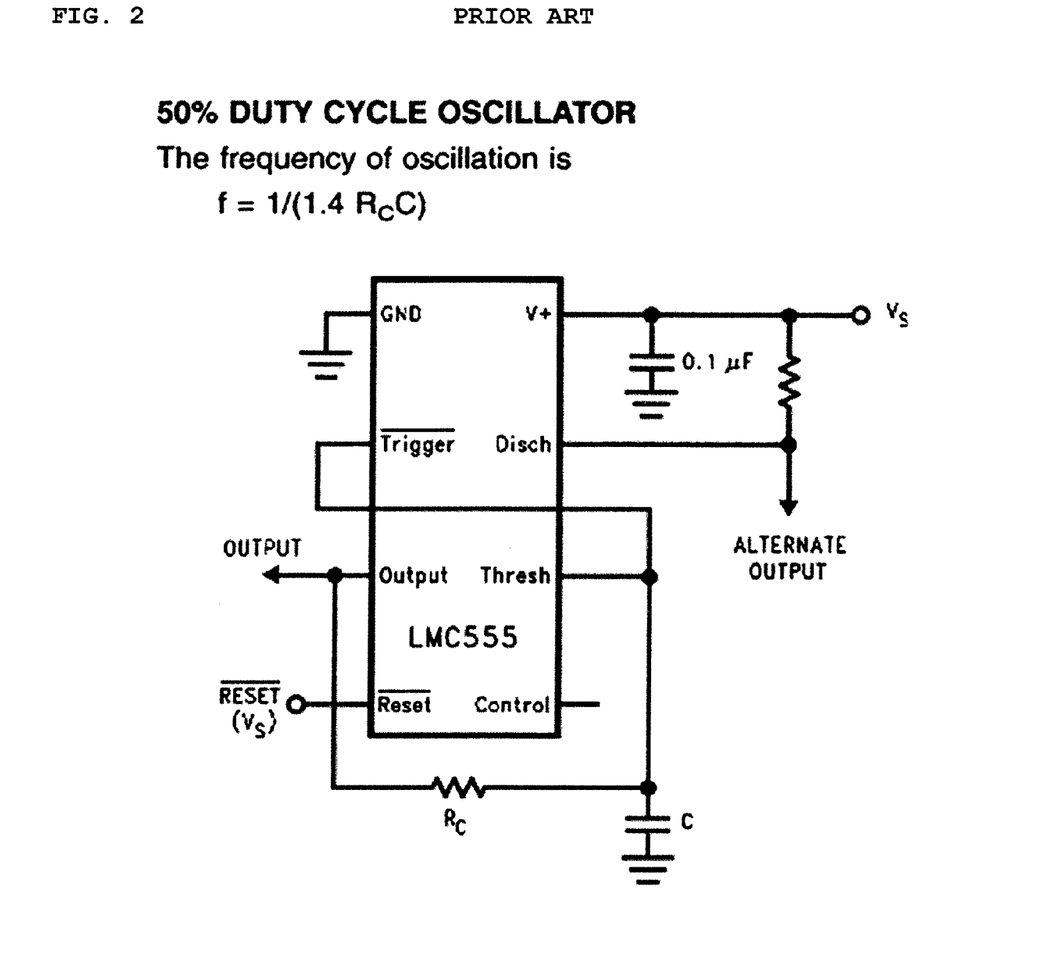
FIG. 2 shows a configuration of a conventional CMOS timer IC having 50% duty cycle.

FIG. 2 shows a configuration of a conventional CMOS timer IC having 50% duty cycle and a usable frequency range of 50 KHz through 1 MHz. The stability of the CMOS timer IC has been verified and thus the CMOS timer IC has been used for long time. The present invention uses this CMOS timer IC for the power converter circuit. Soft-start time is fixed fundamentally and the CMOS timer IC operates at a maximum value of set voltage until a feedback control circuit operates irrespective of generation of a DC voltage at the secondary side.

Accordingly, the power converter according to the present invention includes a frequency varying means capable of varying a frequency according to feedback control of the CMOS timer IC.

Figure 3:
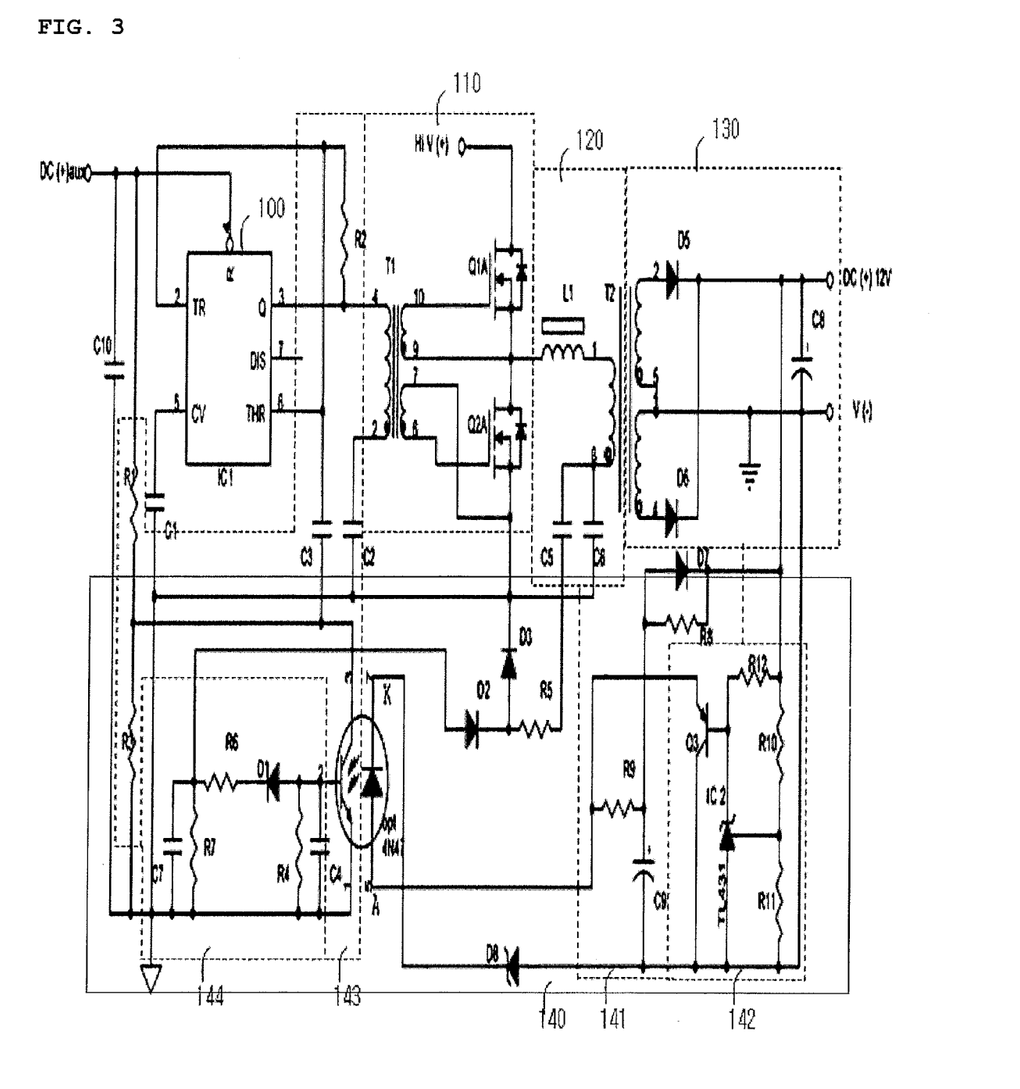
FIG. 3 is a circuit diagram of an LLC half-bridge power converter for driving an LED according to the present invention.

FIG. 3 is a circuit diagram of an LLC half-bridge power converter for driving an LED according to the present invention. Referring to FIG. 3, the LLC half-bridge power converter for driving an LED is configured to generate an output pulse signal through an output unit 110 according to frequency control of a control 110, resonate the output pulse signal of the output unit 110 through an LLC resonator 120, rectify the output pulse signal through a rectifier 130 at the secondary side of the LLC resonator 120 to output a DC voltage to a load and feed back the output of the rectifier 130 to the controller 110 through a feedback unit 140.

The controller 100 is a CMOS timer IC that has 50% duty and a usable frequency range of 50 KHz through 1 MHz according to a capacitance variation of a frequency varying condenser C3 and receives a feedback signal according to a soft-start set value set to the feedback unit 140 to vary the output frequency thereof according to the capacitance variation of the frequency varying condenser C3 to thereby control the final output level of the rectifier 130.

The feedback unit 140 detects the output of the rectifier 130 and operates an opto-coupler OPT according to the soft-start set value. The feedback unit 140 is configured to control the opto-coupler OPT to be tuned off when the output of the rectifier 130 exceeds a set rated voltage and vary the capacitance of the frequency varying condenser C3 of the controller 100 according to the opto-coupler OPT.

The feedback unit 140 includes a soft-start setting unit 141 that sets a time constant of the output of the rectifier 130 according to a resistor R8 and a condenser C9 and generates a soft-start voltage through a resistor R9, a level detector 142 that divides the output of the rectifier 130 through voltage-dividing resistors R10 and R11, detects whether the divided voltages exceed a set level through a level detecting element IC2 and bypasses the output of the soft-start setting unit 141 when the divided voltages exceed the set level through a PNP transistor Q3, the opto-coupler OPT for a feedback signal, which receives the output of the soft-start setting unit 141 controlled by the level detector 132 through an anode to control a light-emitting element and generates a feedback signal according to an NPN light-receiving element, a controller frequency varying unit 143 that divides an external DC voltage through voltage-dividing resistors R1 and R3, applies a bias voltage to a second terminal of the frequency varying condenser C3 of the controller 100 and controls the bias of the second terminal of the frequency varying condenser C3 according to the light-receiving element of the opto-coupler OPT, and a protecting circuit 144 that receives the output pulse signal of the output unit 110 through reverse diodes D3 and D2 and controls the base of the light-receiving element of the opto-coupler OPT according to a reverse diode D1 based on set values of a condenser C7 and resistors R6 and R7.

As described above, the controller 100 of the LLC half-bridge power converter for driving an LED according to the present invention is a widely used CMOS timer IC having a usable frequency range of 50 KHz through 1 MHz. The output frequency of the CMOS timer IC is determined by the frequency varying condenser C3 and a resistor R2 to switch a primary coil of a first transformer T1 of the output unit 110.

The present invention is characterized that the capacitance of the frequency varying condenser C3 is varied to change the frequency of the CMOS timer IC. The controller frequency varying unit 143 divides the external DC voltage through the voltage-dividing resistors R1 and R3 and applies a divided voltage to the second terminal of the frequency varying condenser C3 to set the bias voltage so as to set the frequency of the CMOS timer IC. Here, the opto-coupler OPT of the feedback unit 140 controls the bias voltage applied to the second terminal of the frequency varying condenser C3 to vary the capacitance of the frequency varying condenser C3.

The LLC half-bridge power converter for driving an LED according to the present invention shown in FIG. 3 uses the CMOS timer IC that is a 50% duty cycle oscillator as shown in FIG. 2 in order to achieve output voltage stabilization. Particularly, the LLC half-bridge power converter for driving an LED according to the present invention includes the frequency varying condenser C3 as a frequency varying means, as shown in FIG. 4.

Figure 4:
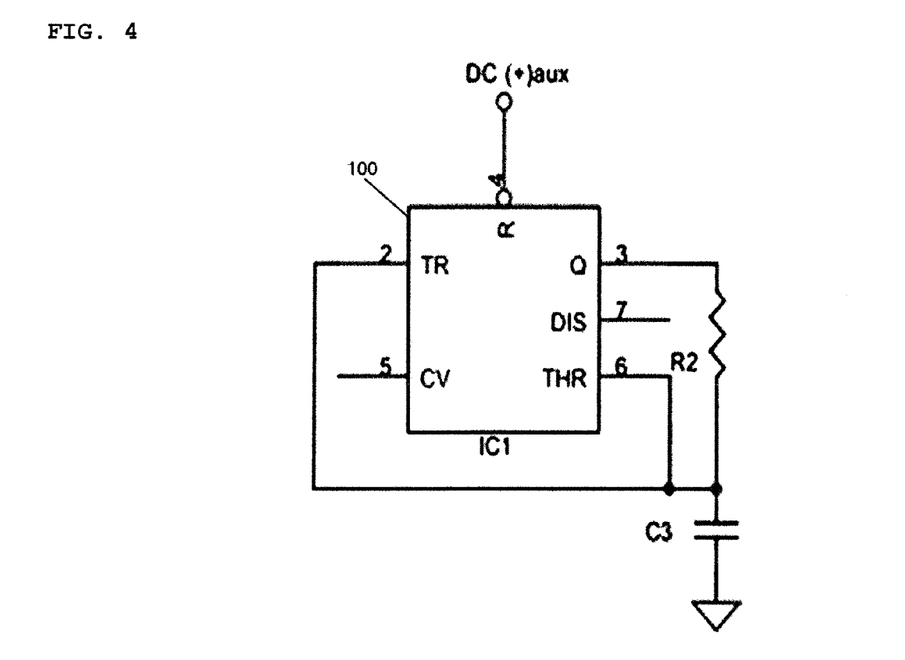
FIG. 4 shows a CMOS timer IC functioning as a controller of the LLC half-bridge power converter for driving an LED according to the present invention.

Referring to FIG. 4, the frequency varying condenser C3 is coupled to a THR terminal of the CMOS timer IC corresponding to the controller 100 and connected to a Q terminal of the CMOS timer IC through the resistor R2.

In this configuration, the frequency of the CMOS timer IC is varied according to a variation in the resistor R2 or a capacitance variation in the condenser C3. In an embodiment of the present invention, the frequency is varied using a capacitance variation in the condenser C3.

Figure 5:
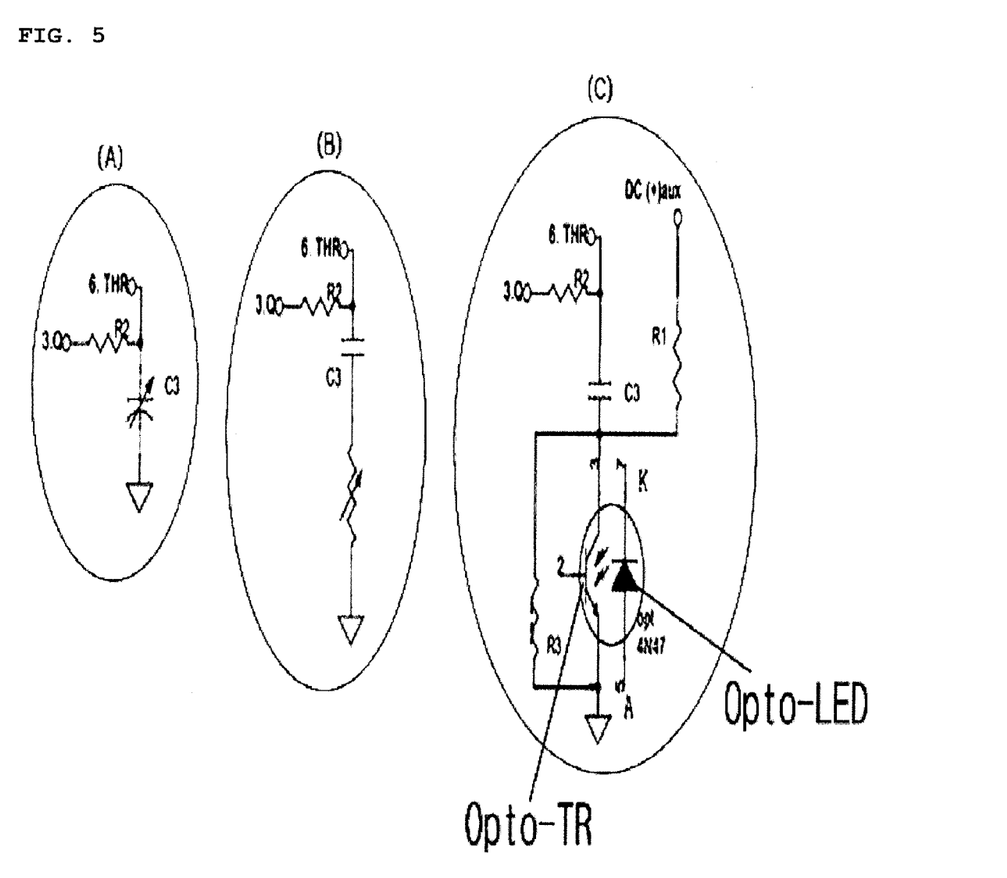
FIG. 5 shows a frequency variation in the CMOS timer IC according to the present invention.

FIGS. 5(A), 5(B) and 5(C) show capacitance variable frequency varying methods. FIG. 5(A) shows that the condenser C3 is varied by a feedback unit and FIG. 5(B) shows that a variable resistor VR is serially connected to the condenser C3 and varied by the feedback unit. However, a varying speed is limited when current components are used, and thus it is impossible to practically use the varying methods shown in FIGS. 5(A) and 5(B). Accordingly, the present invention adopts a method of varying the capacitance of the condenser C3 using a light-receiving element TR of the opto-coupler OPT, as shown in FIG. 5(C).

Referring to FIG. 5(C), a low frequency is set to 50 KHz according to R2 and C3 when a cathode and an emitter of the light-receiving element TR of the opto-coupler OPT are on and a high frequency is set to 1 MHz according to resistors R2 and R3 when the light-receiving element TR of the opto-coupler OPT is turned off.

In this state, the frequency is varied according to increase/decrease in the current of a light-emitting element Opto-LED of the opto-coupler OPT. That is, the frequency increases to the high frequency when the light-emitting element Opto-LED of the opto-coupler OPT has a minimum current and the frequency is changed from the high frequency to the low frequency when the current of the light-emitting element Opto-LED of the opto-coupler OPT increases according to setting of the feedback unit 140. That is, maximum power is satisfied.

The full wave square frequency of the LLC half-bridge power converter for driving an LED according to the present invention is varied using the CMOS timer IC. Here, the resistor R3 and the cathode and emitter of the light-receiving element Opto-TR of the opto-coupler OPT are connected in parallel with the frequency varying condenser C3 to change the resistance component according to the light-receiving element Opt-TR of the opto-coupler OPT so as to vary the serial resistance component of the controller frequency varying condenser C3. That is, the capacitance of the condenser C3 is varied. This operation determines frequency variation of the CMOS timer IC.

Accordingly, when the external DC voltage is applied to the LLC half-bridge power converter according to the present invention, the primary side starts to execute the function thereof when the power of the secondary side is at the low state to charge the time constant condenser C9 through a time constant resistor R8 of the soft-start setting unit 141 of the feedback unit 140.

The time constant resistor R8 and condenser C9 set soft-start time. Here, when a voltage higher than 3.1V is applied to the anode node A of the light-emitting element Opto-LED of the opto-coupler OPT, the light-emitting element Opto-LED of the opto-coupler OPT is turned on and the light-receiving element Opto-TR is turned on with basic current. Generation of the basic current is determined by the resistor R3 and a high frequency at the basic current is set.

Here, the cathode-emitter (CE) voltage of the light-receiving element Opto-TR of the opto-coupler OPT is determined by the current of the light-emitting element Opto-LED and a variation in the cathode-emitter voltage of the light-receiving element Opto-TR varies the combined resistance of the resistors R1 and R3. Accordingly, the capacitance of the frequency varying condenser C3 is varied to change the frequency. As a degree to which the opto-coupler is turned on increases, the capacitance of the frequency varying condenser C3 increases, the frequency decreases and the output of the rectifier 130 increases.

Figure 6:
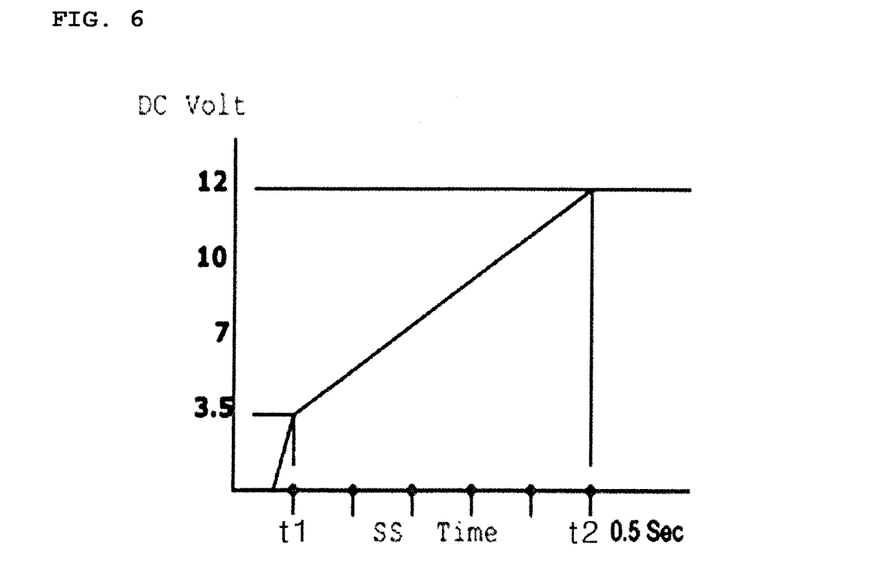
FIG. 6 shows an output characteristic waveform for explaining soft-start according to the present invention.

FIG. 6 shows an output voltage variation characteristic waveform according to the present invention. Referring to FIG. 6, the output of the rectifier 130 abruptly increases to approximately 3.5V at t1 within a short time at the same time when power is on. This increased voltage charges the condenser C9 according to the resistor R8 of the soft-start setting unit 141 and is applied to the anode node A of the light-emitting element Opto-LED via the resistor R9. When a voltage higher than 3.1V is applied to the light-emitting element Opto-LED, current flows through the light-emitting element Opto-LED. At this point, the cathode-emitter resistance of the light-receiving element Opto-TR, that is, the parallel resistance of the resistor R3 and the cathode-emitter of the light-receiving element Opto-TR starts to decrease, and thus the capacitance of the frequency varying condenser C3 increases. Accordingly, the frequency of the CMOS timer IC becomes low to increase the output voltage of the rectifier 130.

The increase in the output voltage of the rectifier 130 is determined by the time constant of the soft-start setting unit 141. That is, the gradient of the soft-start time, shown in FIG. 6, is determined to increase the output voltage of the rectifier 130.

The time constant is determined by the time constant resistor R8 and condenser C9 to achieve soft-start and, when the output voltage reaches a set value (for example, 12V), the output voltage starts to be controlled by the level detector 142. The output voltage of the rectifier 130 is divided by the voltage dividing resistors R10 and R11 and a divided voltage is applied to a control terminal of the level detecting element IC2 (TL431) of the level detector 142. When the output voltage of the rectifier 130 reaches the set value, the voltage of the control terminal of the level detecting element IC2 becomes a turn-on voltage of 2.5V.

Since a reference voltage R of the level detecting element IC2 is 2.5V, the level detecting element IC2 operates when a voltage higher than 2.5V is applied thereto, and thus the cathode voltage of the level detecting element IC2 also becomes 2.5V and, simultaneously, the PNP transistor Q3 is turned on. At the same time, the voltage of the anode node A of the light-emitting element Opto-LED of the opto-coupler OPT is changed to 3.1V (=2.5V+0.6V (voltage across the base B and emitter E of Q3)).

As described above, the initial soft-start function is performed using the secondary voltage increase to achieve voltage control, and thus a set basic voltage can be maintained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An LLC half-bridge power converter for driving an LED, which is configured to generate an output pulse signal from an external input power DC through an output unit (110) according to frequency control of a controller (100), resonate the output pulse signal of the output unit (110) through an LLC resonator (120), rectify the output pulse signal through a rectifier (130) at the secondary side of the LLC resonator (120) to output a DC voltage to a load, detect the output of the rectifier (130) through a feedback unit (140) and feed back the output of the rectifier (130) to the controller (100), wherein the controller 100 is a CMOS timer IC that has 50% duty and a usable frequency range of 50 KHz through 1 MHz and receives a feedback signal based on a soft-start set value set to the feedback unit (140) to vary the output frequency thereof according to a capacitance variation of a frequency varying condenser (C3) to control the final output level of the rectifier (130), and the feedback unit (140) is configured to detect the output of the rectifier (130) and operates an opto-coupler according to the soft-start set value, control the opto-coupler to be tuned off when the output of the rectifier (130) exceeds a set rated voltage and vary the capacitance of the frequency varying condenser (C3) of the controller (100) according to the opto-coupler.

2. The LLC half-bridge power converter for driving an LED according to claim 1, wherein the feedback unit (140) comprises:

a soft-start setting unit (141) setting a time constant of the output of the rectifier (130) according to a resistor (R8) and a condenser (C9) and generating a soft-start voltage through a resistor (R9);

a level detector (142) dividing the output of the rectifier (130) through voltage-dividing resistors (R10) and (R11), detecting whether the divided voltages exceed a set level through a level detecting element (IC20) and bypassing the output of the soft-start setting unit (141) when the divided voltages exceed the set level through a PNP transistor (Q3);

the opto-coupler (OPT) for a feedback signal, which receives the output of the soft-start setting unit (141) controlled by the level detector (132) through an anode to control a light-emitting element and generates a feedback signal according to an NPN light-receiving element; and a controller frequency varying unit (143) dividing the external input power through voltage-dividing resistors (R1 and R3), applying a bias voltage to a second terminal of the frequency varying condenser (C3) of the controller (100) and controlling the bias of the second terminal of the frequency varying condenser (C3) according to the light-receiving element of the opto-coupler (OPT).

3. The LLC half-bridge power converter for driving an LED according to claim 2, further comprising a protecting circuit (144) that receives the output pulse signal of the output unit (110) through reverse diodes (D3 and D2) and controls a base of the light-receiving element of the opto-coupler (OPT) according to a reverse diode (D1) based on set values of a condenser (C7) and resistors (R6 and R7).

* * * * *